US009868052B1

(12) United States Patent
Koh et al.

(10) Patent No.: US 9,868,052 B1
(45) Date of Patent: Jan. 16, 2018

(54) SYSTEM AND METHOD FOR COMPARING SEGMENTS OF PLAYERS THAT ARE DIFFERENTIATED BASED ON A SYSTEM VARIABLE

(71) Applicant: Kabam, Inc., San Francisco, CA (US)

(72) Inventors: James Koh, Mountain View, CA (US); Kellen Christopher Smalley, Dublin, CA (US)

(73) Assignee: Kabam, Inc., San Francisco, CA (US)

( * ) Notice: Subject to any disclaimer, the term of this patent is extended or adjusted under 35 U.S.C. 154(b) by 709 days.

(21) Appl. No.: 13/709,803

(22) Filed: Dec. 10, 2012

(51) Int. Cl.
*G06Q 50/00* (2012.01)
*A63F 9/24* (2006.01)
*G06Q 30/02* (2012.01)

(52) U.S. Cl.
CPC ........... *A63F 9/24* (2013.01); *G06Q 30/0201* (2013.01); *G06Q 50/01* (2013.01)

(58) Field of Classification Search
CPC ........ A63F 2300/5533; A63F 2300/558; A63F 13/798; A63F 13/45; A63F 13/55; A63F 13/60
See application file for complete search history.

(56) References Cited

U.S. PATENT DOCUMENTS

| | | | |
|---|---|---|---|
| 6,371,855 B1 * | 4/2002 | Gavriloff | 463/42 |
| 6,746,332 B1 | 6/2004 | Ing et al. | 463/42 |
| 7,861,244 B2 | 12/2010 | Vasile | 718/1 |
| 8,036,930 B2 | 10/2011 | Brig Null et al. | 705/7.33 |
| 8,069,168 B2 | 11/2011 | Fitzpatrick et al. | 707/732 |
| 8,221,221 B2 | 7/2012 | Riego | 463/23 |
| 8,246,466 B2 | 8/2012 | Herrmann et al. | 463/42 |
| 8,875,308 B1 * | 10/2014 | Fabrikant | G06F 3/0482 726/1 |
| 2002/0138607 A1 | 9/2002 | O'Rourke et al. | 709/224 |
| 2004/0249848 A1 * | 12/2004 | Carlbom et al. | 707/102 |
| 2008/0076576 A1 * | 3/2008 | Graham | G07F 17/32 463/42 |
| 2010/0031165 A1 | 2/2010 | Lindquist | 715/757 |
| 2010/0050088 A1 | 2/2010 | Neustaedter et al. | 715/745 |
| 2010/0144443 A1 * | 6/2010 | Graham et al. | 463/42 |
| 2010/0144444 A1 * | 6/2010 | Graham | A63F 13/10 463/42 |

(Continued)

*Primary Examiner* — James S McClellan
*Assistant Examiner* — Sylvia Weatherford
(74) *Attorney, Agent, or Firm* — Sheppard Mullin Richter & Hampton LLP

(57) ABSTRACT

A system and method is described for comparing and displaying user-selected segments of players of an online game to identify and predict trends related to player activity and monetization in the game, determine relative response to events that occur in the game, and/or analyze other correlations. The players may be segmented on or more system variables chosen by a user. A user may be a system administrator, a game developer, and/or other user interested in identifying and predicting trends, determining responses to events, and/or engaging in other analysis relating to the game. A comparison of the first segment of players and the second segment of players based on a first feature and a second feature may allow identification and prediction of trends related to player activity and monetization in the game, determine relative response to events that occur in the game, and/or analyze other correlations in an online game.

14 Claims, 5 Drawing Sheets

(56) References Cited

U.S. PATENT DOCUMENTS

| | | | |
|---|---|---|---|
| 2011/0173257 A1* | 7/2011 | Tu | H04L 51/04 709/203 |
| 2011/0218045 A1* | 9/2011 | Williams et al. | 463/42 |
| 2011/0218945 A1 | 9/2011 | Betzler et al. | 706/12 |
| 2012/0050286 A1* | 3/2012 | Yockey | A63F 13/55 345/420 |
| 2012/0142429 A1* | 6/2012 | Muller | A63F 13/12 463/42 |
| 2013/0045806 A1* | 2/2013 | Bloodworth | 463/43 |
| 2013/0137522 A1* | 5/2013 | Kusano | G07F 17/3239 463/42 |
| 2013/0254680 A1* | 9/2013 | Buhr | A63F 13/12 715/753 |
| 2013/0316836 A1* | 11/2013 | Vogel et al. | 463/43 |

\* cited by examiner

SYSTEM AND METHOD FOR COMPARING SEGMENTS OF PLAYERS THAT ARE DIFFERENTIATED BASED ON A SYSTEM VARIABLE

FIELD

The disclosure relates to comparing user-selected segments of players of an online game to identify and predict trends related to player activity and monetization in the game, determine relative response to events that occur in the game, and/or analyze other correlations.

BACKGROUND

Various techniques for providing a fixed set of data relating to the operation, administration, and/or performance of a virtual world are known. The display of metrics relating to a player's interaction with and performance in an online game is also known. Conventional systems, however, suffer from various drawbacks and inefficiencies relating to the identifying trends in an online game or a virtual world based on differentiated groupings of players. For example, conventional systems may fail to enable the comparison and display of one or more user-selected segments of players, where a segment may include one or more players that have shared a particular event or experience in the online game.

SUMMARY

One aspect of the disclosure relates to comparing and displaying user-selected segments of players of an online game to identify and predict trends related to player activity and monetization in the game, determine relative response to events that occur in the game, and/or analyze other correlations. The players may be segmented on or more system variables chosen by a user. A user may be a system administrator, a game developer, and/or other user interested in identifying and predicting trends, determining responses to events, and/or engaging in other analysis relating to the game. A comparison of a first segment of players and a second segment of players based on a first feature and a second feature may allow a user to identify and predict trends related to player activity and monetization in the game, determine relative response to events that occur in the game, and/or analyze other correlations in an online game.

A system configured to facilitate comparison of one or more user-selected segments of players may include one or more processors configured to execute compute program modules. The program modules may comprise a space module, a communication module, a segmentation module, a display module, and/or other modules.

The space module may be configured to execute an instance of a virtual space. The space module may be configured to implement the instance of the virtual space to facilitate participation by players in a game within the virtual space by determining view information from the instance and transmitting the view information to the client computing platforms associated with the players. The view information may facilitate the presentation of views of the virtual space to the players by the client computing platforms.

The communication module may be configured to receive segmentation input regarding a selection of one or more system variables by which to differentiate the one or more players into one or more segments of players. The system variables may comprise, for example, account creation date, participation in the game in a date range, amount of logins to the game, player type, participation in a game event, and/or other variables by which to differentiate the one or more players into one or more segments of players. The communication module may also be configured to receive first feature input regarding a selection of a first feature by which to compare players and receive second feature input regarding a selection of a second feature by which to compare players.

The segmentation module may be configured to form at least a first segment of players and a second segment of players based on the segmentation input. In some implementations, the first segment of players may comprise one or more players that share a first value relating to the system variable and the second segment may comprise one or more players that share a second value relating to the system variable, where the second value may be different from the first value.

The display module may be configured to display at least a comparison of the first segment of players and the second segment of players based on the first feature and the second feature. In some implementations, the display module may be configured to display a set of values relating to the first segment of players based on the first feature and the second feature and display a set of values relating to the second segment of players based on the first feature and the second feature.

In some implementations, a computer-implemented method of facilitating comparison of one or more user-selected segments of players may be implemented in a computer system comprising one or more physical processors. The method may comprise executing an instance of a virtual space; implementing the instance of the virtual space to facilitate participation by the one or more players in a game within the space by determining view information from the instance and transmitting the view information to one or more client computing platforms associated with the one or more players that facilitate presentation of views of the virtual space to the one or more players by the one or more client computing platforms; receiving segmentation input regarding a selection of one or more system variables by which to differentiate the one or more players into one or more segments of players, the system variable comprising one of: account creation date, participation in the game in a date range, amount of logins to the game, or player type; forming at least a first segment of players and a second segment of players based on the segmentation input; receiving first feature input regarding a selection of a first feature by which to compare the first segment of players and the second segment of players; receiving second feature input regarding a selection of a second feature by which to compare the first segment of players and the second segment of players; and displaying a comparison of the first segment of players and the second segment over players based on the first feature and the second feature.

In some implementations a non-transitory electronic storage media may store information related to a comparison of one or more user-selected segments of players. The stored information may comprise a memory configured to store information related to one or more players of an online game and instructions configured to cause a client computing platform to: execute an instance of a virtual space; implement the instance of the virtual space to facilitate participation by the one or more players in a game within the space by determining view information from the instance and transmitting the view information to one or more client computing platforms associated with the one or more players that facilitate presentation of views of the virtual space to the one or more players by the one or more client computing platforms; receive segmentation input regarding a selection of one or more system variables by which to differentiate the one or more players into one or more segments of players, the system variable comprising one of: account creation date, participation in the game in a date range, amount of logins to the game, or player type; form at least a first segment of players and a second segment of players based on the segmentation input; receive first feature input regarding a selection of a first feature by which to compare the first segment of players and the second segment of players; receive second feature input regarding a selection of a second feature by which to compare the first segment of players and the second segment of players; and display a comparison of the first segment of players and the second segment over players based on the first feature and the second feature.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
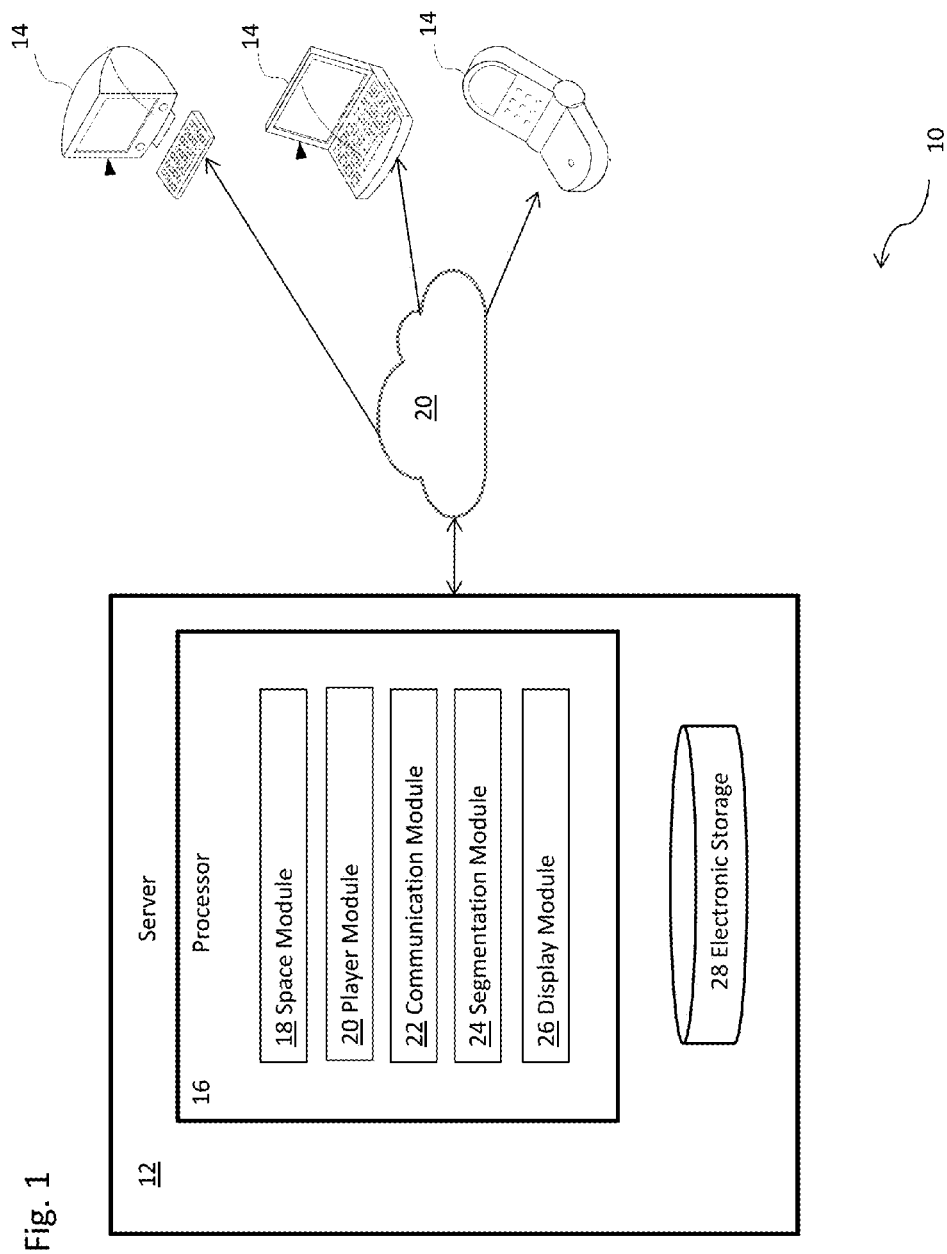
FIG. 1 illustrates a system configured to display compared segments of players of an online game.

FIG. 1 illustrates a system 10 configured to display compared segments of players of an online game in a virtual space. System 10 may be configured to provide the virtual space to the players over a network (e.g., network 20). Providing the virtual space may include hosting the virtual space over network 20. System 10 may be configured to display comparisons of user-selected segments of players of an online game to identify and predict trends related to player activity and monetization in the game, determine relative response to events that occur in the game, and/or analyze other correlations. The players may be segmented based on one or more user-selected system variables. A user may be a system administrator, a game developer, and/or other user interested in identifying and predicting trends, determining responses to events, and/or engaging in other analysis relating to the game.

In some implementations, system 10 may include a server 12. The server 12 may be configured to communicate with one or more client computing platforms 14 according to a client/server architecture. The users and players may access system 10 and/or the virtual space via client computing platforms 14.

Server 12 may be configured to execute one or more computer program modules. The computer program modules may include one or more of a space module 18, a player module 20, a communication module 22, a segmentation module 24, a display module 26, and/or other modules.

Space module 18 may be configured to implement the instance of the virtual space executed by the computer modules to determine view information defining views of the virtual space. The view information may then be communicated (e.g., via streaming, via object/position data, and/or other information) from server 12 to client computing platforms 14 for presentation to players. The view information determined and transmitted to a given client computing platform 14 may correspond to an entity being controlled by a player via the given client computing platform 14. The view information determined and transmitted to a given client computing platform 14 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the player.

The instance of the virtual space may comprise a simulated space that is accessible by players via clients (e.g., client computing platforms 14) that present the views of the virtual space to a player. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 18 is not intended to be limiting. Space module 18 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 18, players may control entities to interact with the virtual space and/or each other. The entities may include one or more of characters, objects, simulated physical phenomena (e.g., wind, rain, earthquakes, and/or other phenomena), and/or other elements within the virtual space. Player-controlled characters may include avatars. As used herein, an entity may refer to an object (or group of objects) present in the virtual space that represents an individual player. The entity may be controlled by the player with which it is associated. The player controlled element(s) may move through and interact with the virtual space (e.g., non-player characters in the virtual space, other objects in the virtual space). The player controlled elements controlled by and/or associated with a given player may be created and/or customized by the given player. The player may have an "inventory" of virtual goods and/or currency that the player can use (e.g., by manipulation of a player character or other player controlled element, and/or other items) within the virtual space.

Control over the entities may be exercised by the players through control inputs and/or commands input through client computing platforms 14. The players may interact with each other through communications exchanged within the virtual space. Such communications may include one or more of textual chat, instant messages, private messages, voice communications, and/or other communications. Communications may be received and entered by the players via their respective client computing platforms 14. Communications may be routed to and from the appropriate players through server 12 (e.g., through space module 18).

Within the virtual space, players may participate in a game. The game may include various tasks, levels, quests, and/or other challenges or activities for players to participate in. The game may include activities in which players (or their entities) are adversaries, and/or activities in which players (or their entities) are allies. The game may include activities in which players (or their entities) are adversaries of non-player characters, and/or activities in which players (or their entities) are allies of non-player characters. In the game, entities controlled by the player may obtain points, virtual currency or other virtual items, experience points, levels, and/or other demarcations indicating experience and/or success. Space module 18 may be configured to perform the functions associated with the game in executing the instance of the virtual space.

Player module 20 may be configured to access and/or manage one or more player accounts associated with players of system 10. The player accounts may include player information. The one or more player accounts and/or player information may include information stored by server 12, one or more of the client computing platforms 14, and/or other storage locations. The player accounts may include, for example, information identifying players (e.g., a username or handle, a number, an identifier, and/or other identifying information) within the virtual space, security login information (e.g., a login code or password), virtual space account information, subscription information, virtual currency account information (e.g., related to currency held in credit for a player), relationship information (e.g., information related to relationships between players in the virtual space), virtual space usage information, demographic information associated with players, interaction history among players in the virtual space, information stated by players, activity information of players, browsing history of players, a client computing platform identification associated with a player, a phone number associated with a player, player settings, and/or other information related to players. The player information may include and/or indicate an activity level of the player. The activity level may include previous login time(s), previous logout time(s), login frequency, time spent logged in, and/or other activity information. The player information may also include information related to purchases in or for the virtual space. Such information may include, for example, activity information for individual transactions, a spend rate, a total spend amount, and/or other information related to player purchases.

As will be discussed further below, players may participate in the virtual space by controlling entities within the virtual space. The player information in the player accounts may include information related to the entities controlled by the players in the virtual space. Such information may include, for example, an entity type, an entity class, an entity identification, a level, inventory information, status information, and/or other information related to entities controlled by players in the virtual space.

Communication module 22 may be configured to receive segmentation input regarding a selection of one or more system variables by which to differentiate the one or more players into one or more segments of players. The system variables may comprise, for example, account creation date, participation in the game in a date range, amount of logins to the game, player type, participation in a game event, platform by which the virtual space is accessed (e.g., via a social network website, a microblogging service, and/or other online platforms), engagement in relationships in the game (e.g., amount of communications with other players, number of friendships in the game for a player, number of alliances for a player, and/or other engagement metrics), an amount of inventory maintained by a player (e.g., a total value of inventory maintained by a player, an amount of virtual currency associated with a player, a type of virtual item obtained by a player, virtual real estate owned by a player, experience points associated with a player, etc.) and/or other variables by which to differentiate the one or more players into one or more segments of players. The communication module 22 may also be configured to receive first feature input regarding a selection of a first feature by which to compare players and receive second feature input regarding a selection of a second feature by which to compare players.

Segmentation module 24 may be configured to form at least a first segment of players and a second segment of players based on the segmentation input obtained by communication module 22. In some implementations, the first segment of players may comprise one or more players that share a first value relating to the system variable and the second segment may comprise one or more players that share a second value relating to the system variable, where the second value may be different from the first value. For example, a first segment of players may be formed based on values of a first system variable of the segmentation input. The first segment may include some portion of the overall players having values of the system variable that correspond to each other. This may include values that are the same, values that are equal, values that fall within a specified range, values that are at least as adjacent as a threshold of some adjacency metric, and/or other values that correspond to each other. The use of an exemplary segment formed based on a single system variable is not intended to be limiting. The scope of this disclosure extends to implementations in which the first segment is formed on the first system variable, and on one or more other system variables.

In some implementations, segmentation module 24 may be configured to identify segments of players that have shared an event during a time span. For example, a segment of players may have created an account on a same day or in a same time span, may have engaged in a same or similar quest in the online game in a same time span, logged in to the online game at a same time or in a same time span, made a purchase of a same or similar item at a same time or in a same time span, formed a same or similar type of relationship at a same time or in a same time span, and/or shared other events in common. Segmentation module 24 may identify segments of players that share one or more events through analysis of the values related to the system variable of the segmentation input obtained by communication module 22, and/or from other sources.

In some implementations, communication module 22 may be configured to receive user selection of one or more system variables. Communication module 22 may be configured to define a graphical user interface that is provided to a user to receive entry and/or selection of such system variables.

Figure 2:
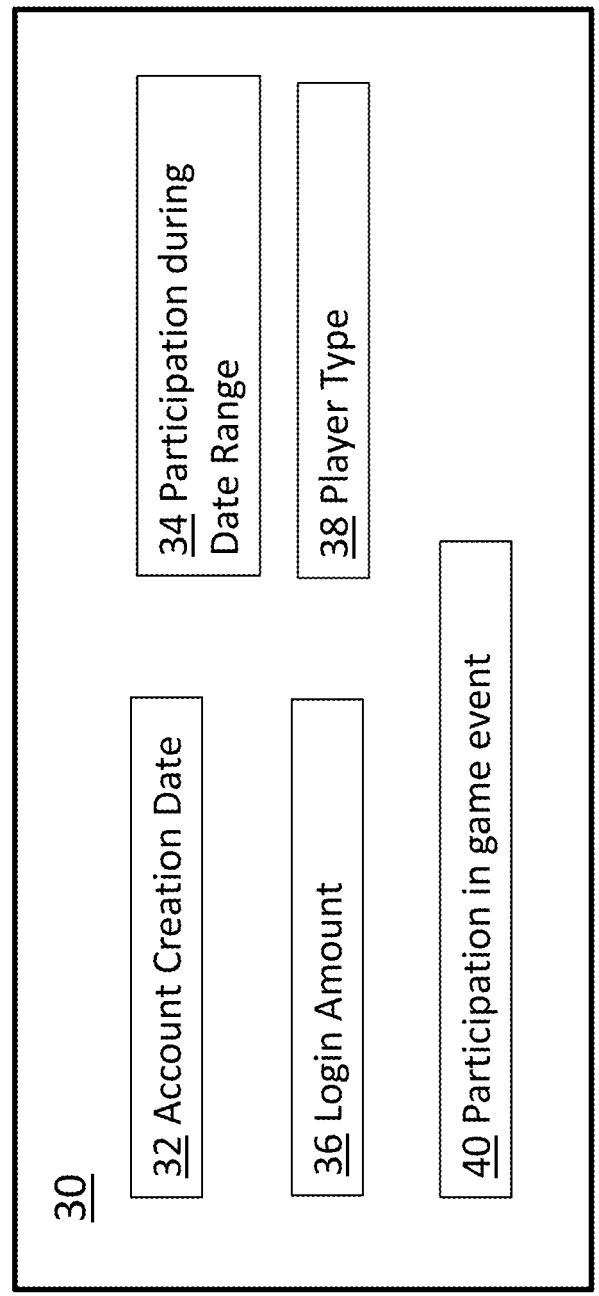
FIG. 2 illustrates a view of a graphical user interface configured to receive entry and/or selection of a system variable relating to player segmentation.

By way of illustration, FIG. 2 depicts a view 30 of a graphical user interface configured to receive entry and/or selection of one or more values for one or more system variables that may be used to segment players of the virtual space. View 30 may include one or more of an account creation field 32, a participation in date range field 34, a login amount field 36, a player type field 38, a participation in game event field 40, and/or other fields relating to a system variable. The entered and/or selected system variable value(s) may be implemented to determine whether individual players should be included in the player segment. The entered and/or selected system variables(s) may specify a value that players should have to be included and/or excluded from the segment, a range to determine whether players should be included and/or excluded, and/or may specify inclusion or exclusion in other ways.

For example, account creation field 32 may be configured to receive entry and/or selection of one or more dates and/or date ranges relating to account creation date for a player segment being defined by the user. In some implementations, account creation field 32 may be configured to receive entry and/or selection of a number of days, number of weeks, number of months, and/or other time span for a player segment being defined by the user. In these implementations, a player segment may comprise players with an account creation date within the time span. For example, when the time span is one week, a first segment may comprise players that created an account in a first week, and a second segment may comprise players that created an account in a second week. Other types of segmentation based on account creation date may be implemented as well.

Participation in a date range field 34 ("participation field") may be configured to receive entry and/or selection of one or more dates and/or date ranges relating to account creation date for a player segment being defined by the user. For example, a first segment may comprise players that participated in a first day in the date range and a second segment may comprise players that participated in a second day in the date range. In some implementations, participation field 34 may be configured to receive entry and/or selection of a number of days, number of weeks, number of months, and/or other time span for a player segment being defined by the user. In some implementations, a player segment may comprise players that participated in the online game within the time span. For example, when the time span is one week, a first segment may comprise players that participated in the online game in a first week, and a second segment may comprise players that participated in the online game in a second week. Other types of segmentation based on participation in a date range may be implemented as well.

Login amount field 36 may be configured to receive entry and/or selection of a number of days, number of weeks, number of months, and/or other time span for a player segment being defined by the user. In these implementations, a player segment may comprise players that logged into the game within the time span. For example, a first segment may comprise players that logged in a first amount of times in the time span, and a second segment may comprise players that logged in a second amount of times in the time span. Other types of segmentation based on login amount may be implemented as well.

Player type field 38 may be configured to receive entry and/or selection of one or more player types for a player segment being defined by the user. A player type may be one of a predetermined set of player types chosen by a player at account creation, may be based on a type of account created by a player, may correspond to an entity type of one or more of the player's entities in the game, and/or may correspond to other player types. In some implementations, the user may be able to select from a predefined set of player types. For example, a first segment may comprise players that correspond to a first player type and a second segment may comprise players that correspond to a second player type. In some implementations, the user may be able to select one of account type, entity type, and/or other player type to define player segments. When a user selects account type, for example, a first segment may comprise players that correspond to a first account type and a second segment may comprise players that correspond to a second account type. When a user selects entity type, for example, a first segment may comprise players that have an entity in the game of a first entity type and a second segment may comprise players that have an entity in the game of a second entity type. In some implementations, the user may be able to search for a specific player type by which to define player segments. Other types of segmentation based on player type may be implemented as well.

Participation in a game event field 40 ("game event field") may be configured to receive entry and/or selection of one or more tasks, levels, quests, and/or other challenges or activities for a player segment being defined by the user. In some implementations, game event field 40 may be configured to receive entry and/or selection of one or more game events in which a player may have been able to participate. In some implementations, the user may be able to select from a predefined set of game events. For example, a first segment may comprise players that participated in a selected game event and a second segment may comprise players that did not participate in the selected game event. In another example, a first segment may comprise players that began participation in a game event on a first date and a second segment may comprise players that began participation in the game event on a second date. In some implementations, the user may be able to search for a specific game event by which to define player segments. Other types of segmentation based on participation in a game event may be implemented as well.

Returning to FIG. 1, communication module 22 may be configured to receive user selection of at least a first feature by which to compare segments of players and a second feature by which to compare segments of players. Comparing the segments of players on two features, where a first feature relates to, for example, player activity, and a second feature relates to, for example, time duration, may allow a user to identify and predict trends related to player activity and monetization in the game, determine relative response to events that occur in the game, and/or analyze other correlations. The first and second features may relate to other bases for comparison as well. For example, a feature may comprise net revenue, purchase date, number of days in game, lifetime average revenue per player, average revenue per player, date range, demographic information (e.g., age, sex, geographic location, language, income, education, career, marital status, and/or other demographic information), socialization information (e.g., participation in a social network, information derived from a social graph in a social network service, information related to an in-game relationship, a social platform from which the virtual space is accessed, and/or other socialization information), participation level information (e.g., entity class, an entity faction, a usage amount, one or more usage times, a level, inventory in the virtual space, a score, and/or other participation level information), activity information (e.g., activity level of the user, virtual currency account information of the user, relationship information of the user, virtual space usage information of the user, interaction history of the user, browsing history of the user, average participation time in a session of the user, an average time in a session after the user experiences an event of the game, an average time between sessions of the game, a value metric representing the value of the user, a spend velocity, and/or other activity information) and/or other features.

Communication module 22 may be configured to define a graphical user interface that is provided to a user to receive entry and/or selection of at least first feature input comprising a first feature and second feature input comprising a second feature.

The display module 26 may be configured to display at least a comparison of a first segment of players and a second segment over players based on the first feature and the second feature. The display module 26 may display one or more comparisons of segments of players to a user via a user interface. In some implementations, the user interface may be accessed via various channels such as, for example, a webpage, a web portal, an agent (such as a software and/or hardware module) executing on server 12, electronic mail and/or other communication channels that can be used to present the comparisons to a user. In some implementations, the system 10 may present a link to a display of one or more comparisons. In some implementations, the display module 26 may be configured to display a set of values relating to the first segment of players based on the first feature and the second feature and display a set of values relating to the second segment of players based on the first feature and the second feature. The comparisons (and values thereof) displayed by the display module 26 may be dynamically generated based on the segmentation input, first feature input, second feature input, and/or other inputs received at the system 10.

Figure 3:
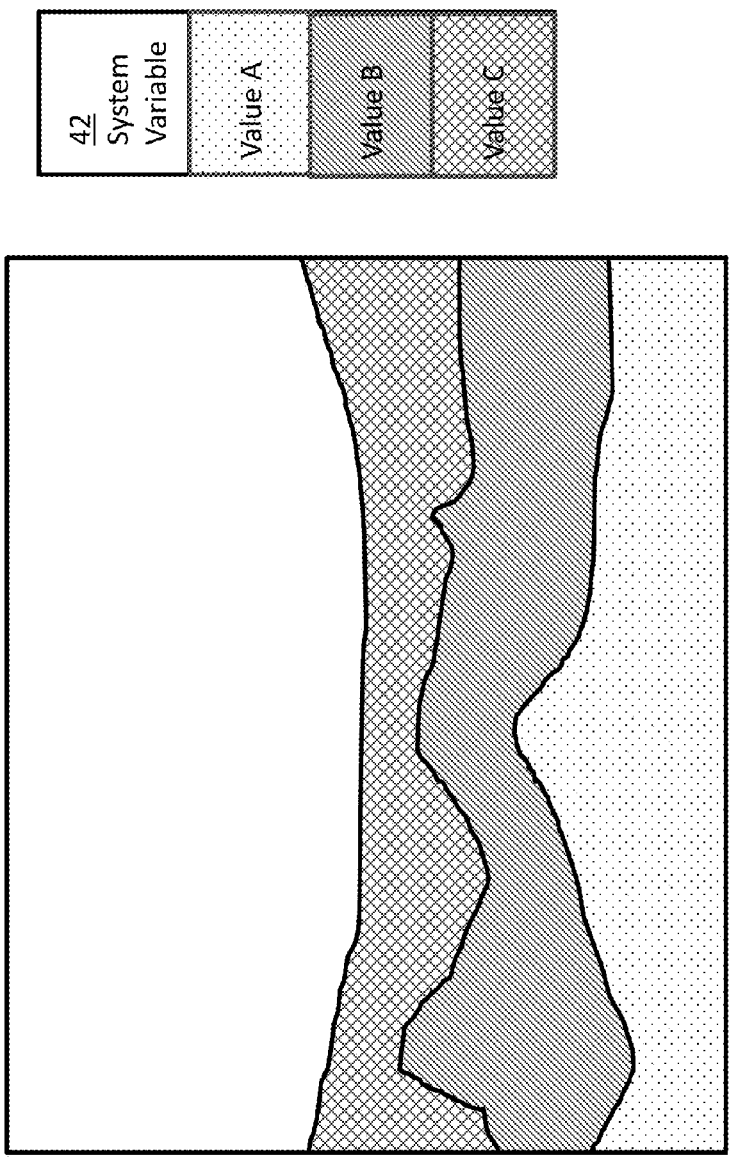
FIG. 3 illustrates an exemplary display of a comparison of segments of players of an online game.

For example, as shown in FIG. 3, display module 26 may be configured to display a comparison of a plurality of segments (e.g., segment A, segment B, segment C, and/or other segments), where the segments are defined based on segmentation input received by communication module 22. Segment A may correspond to Value A of a system variable of the segmentation input. Segment B may correspond to Value B of the system variable. Segment C may correspond to Value C of the system variable. Based on a first feature input and a second feature input received by the communication module 22, display module 26 may display a comparison of segment A, segment B, and segment C based on the first feature of the first feature input and the second feature of the second feature input. In the example shown in FIG. 3, the comparison may comprise a graph. Other types of displays of the comparisons may be used.

The display module 26 may be configured to receive a display input regarding display preferences for the comparison including, for example, a selection of a type of display by which to display the comparison, one or more statistical functions for comparison, and/or other display preferences. For example, a type of display may comprise text, a spreadsheet, a bar graph, a line graph, a histogram, a 3-dimensional display, and/or other types of display. Statistical functions for comparison may include, for example, average value, median value, mode value, first standard deviation, second standard deviation, median absolute deviation, weighted average, and/or other statistical functions. When the display input comprises a selection of a type of display, the display module 26 may display the comparison using the selected type of display. When the display input comprises a selection of one or more statistical functions, the display module 26 may display the comparison in light of the selected statistical functions. For example, when the display input comprises a selection of a first statistical function and a second statistical function, the display module 26 may display a first set of values relating to the first segment of players based on the first feature, the second feature, and the first statistical function, a second set of values relating to the first segment of players based on the first feature, the second feature, and the second statistical function, a third set of values relating to the second segment of players based on the first feature, the second feature, and the first statistical function, and a fourth set of values relating to the second segment of players based on the first feature, the second feature, and the second statistical function.

In some implementations, the display module 26 may be configured to display one or more alerts relating to a comparison of segments of users based on the first feature and the second feature. For example, an alert may be displayed when a first value from the first set of values displayed deviates from the previous corresponding value of the first set of values by more than a threshold amount. In another example, an alert may be displayed when a first value from the first set of values displayed and a corresponding second value from the second set of values deviate from each other by more than a threshold amount. The threshold amount may be set by a user, may be a default value, may be a first standard deviation from an average of the set of values, and/or may be another type of threshold amount. An alert may be displayed when a statistically significant difference exists between a plurality of values in a set of values, or between corresponding plurality of values from different sets of values. An alert may be displayed when a change in value occurs, where the value is associated with a segment of players based on a first feature and a second feature. An alert may be displayed when a change from a first value to a second value occurs and a predetermined amount of subsequent values are similar or the same as the second value.

Figure 4:
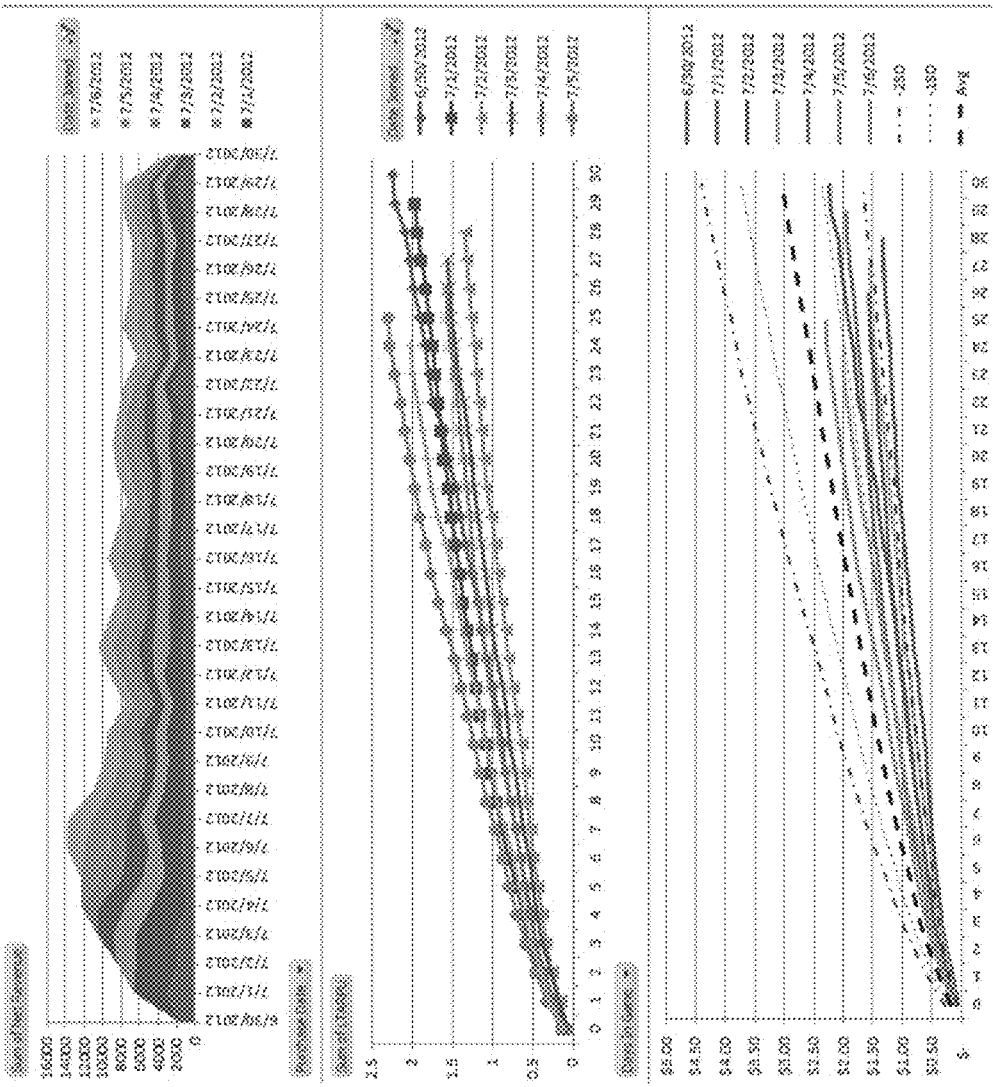
FIG. 4A illustrates an exemplary screenshot of a display of a comparison of segments of players of an online game.
FIG. 4B illustrates an exemplary screenshot of a display of a comparison of segments of players of an online game.
FIG. 4C illustrates an exemplary screenshot of a display of a comparison of segments of players of an online game.

FIG. 4A illustrates an exemplary screenshot of a graphical user interface that comprises a comparison displayed by display module 26, according to various implementations of the invention. The screenshots illustrated in FIG. 5A and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting. The graphical user interface of FIG. 4A and other interfaces described herein may be implemented as a web page communicated from server 12 to a client computing device 14, an application such as a mobile application executing on the client computing device 14 that receives the display information for the interface based on information communicated from display module 24 of server 12, and/or other interface. Whichever type of interface is used, server 12 may communicate the data and/or formatting instructions related to the interface to the client computing device 14, causing the client computing device 14 to generate the various interfaces of FIG. 4A and other drawing figures. Furthermore, server 12 may receive data from the client computing device 14 via the various interfaces, as would be appreciated.

FIG. 4A illustrates an exemplary screenshot of a graphical user interface that comprises a comparison displayed by display module 26, according to various implementations of the invention. The comparison illustrated in the screenshot of FIG. 4A reflects revenue per week. For example, the comparison compares a plurality of segments that are defined based on account creation date, where the segments are compared based on net revenue and purchase date.

FIG. 4B illustrates an exemplary screenshot of a graphical user interface that comprises a comparison displayed by display module 26, according to various implementations of the invention. The comparison illustrated in the screenshot of FIG. 4A reflects the lifetime aggregated revenue per player of a plurality of segments over time. For example, the comparison compares a plurality of segments that are defined based on account creation date, where the segments are compared based on a sum of lifetime revenue per player and a number of days that the player has been in the game.

FIG. 4C illustrates an exemplary screenshot of a graphical user interface that comprises a comparison displayed by display module 26, according to various implementations of the invention. The comparison illustrated in the screenshot of FIG. 4A reflects average revenue per player against a number of days that a player has been involved with the game. For example, the comparison compares a plurality of segments that are defined based on account creation date, where the segments are compared based on a sum of lifetime revenue per player and a number of days that the player has been in the game. The exemplary screenshot of FIG. 4C comprises average values related to the comparison, a first standard deviation from the average values, and a second standard deviation from the average values.

Server 12 and/or client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14 may be operatively linked via some other communication media.

A given client computing platform 14 may include one or more processors configured to execute computer program modules. The computer program modules may be configured to enable an expert or user associated with the given client computing platform 14 to interface with server 12, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Server 12 may include electronic storage 30, one or more processors 16, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information non-transiently. The electronic storage media of electronic storage 30 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may include one or more virtual storage resources (e.g., cloud storage, a virtual private network, and/or other virtual storage resources). Electronic storage 30 may store software algorithms, information determined by processor 16, information received from server 12, information received from client computing platforms 14, and/or other information that enables server 12 to function as described herein.

Processor(s) 16 may provide information processing capabilities within server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is not intended to be limiting, as processor 16 may include a plurality of processors operating in coordination or cooperation. This may include implementations in which server 72 includes a multi-processor device, a farm of server devices operating together, and/or virtual resources provided by the cloud. The processor 16 may be configured to execute modules 18, 20, 22, 24, 26, and/or 28. Processor 16 may be configured to execute modules 16, 18, 20, 22, 24, 26, and/or 28 by software; hardware; firmware; some combination of software, hardware, and/or firmware; and/or other mechanisms for configuring processing capabilities on processor 16.

It should be appreciated that although modules 16, 18, 20, 22, 24, 26, and/or 28 are illustrated in FIG. 1 as being co-located within a single processing unit, in implementations in which processor 16 includes multiple processing units, one or more of modules 16, 18, 20, 22, 24, 26, and/or 28 may be located remotely from the other modules. The description of the functionality provided by the different modules 16, 18, 20, 22, 24, 26, and/or 28 described below is for illustrative purposes, and is not intended to be limiting, as any of modules 16, 18, 20, 22, 24, 26, and/or 28 may provide more or less functionality than is described. For example, one or more of modules 16, 18, 20, 22, 24, 26, and/or 28 may be eliminated, and some or all of its functionality may be provided by other ones of modules 16, 18, 20, 22, 24, 26, and/or 28. As another example, processor 16 may be configured to execute one or more additional modules that may perform some or all of the functionality attributed below to one of modules 16, 18, 20, 22, 24, 26, and/or 28.

Figure 5:
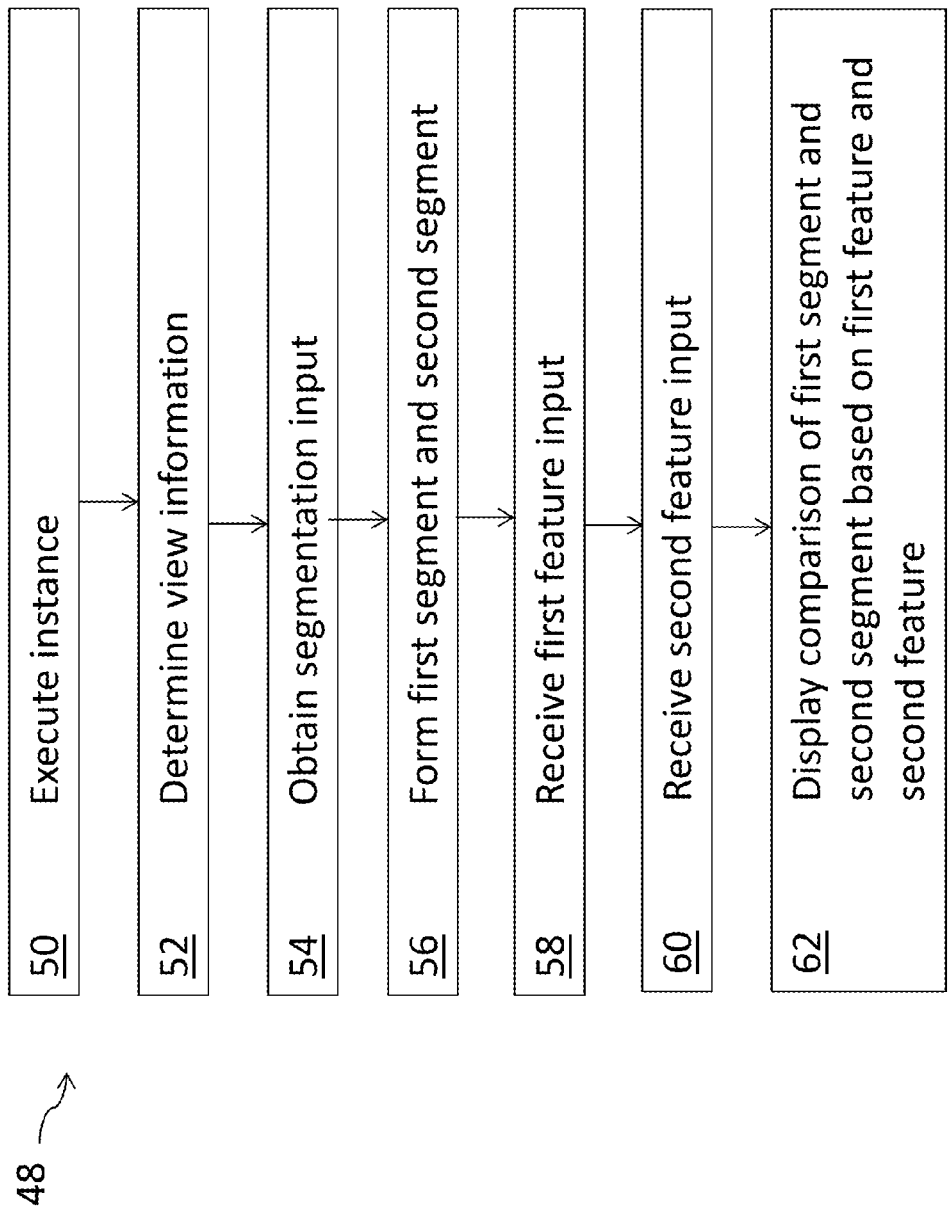
FIG. 5 illustrates a method of displaying compared segments of players of an online game.

FIG. 5 illustrates a method 48 of hosting a virtual space to client computing devices for interaction by users. The operations of method 48 presented below are intended to be illustrative. In some embodiments, method 48 may be accomplished with one or more additional operations not described, and/or without one or more of the operations discussed. Additionally, the order in which the operations of method 48 are illustrated in FIG. 5 and described below is not intended to be limiting.

In some embodiments, method 48 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 48 in response to instructions stored electronically on an electronic storage medium. The one or more processing devices may include one or more devices configured through hardware, firmware, and/or software to be specifically designed for execution of one or more of the operations of method 48.

At an operation 50, an instance of a virtual space may be executed. In some implementations, operation 50 may be performed by a space module the same as or similar to space module 18 (shown in FIG. 1 and described above).

At an operation 52, the executed instance of the virtual space may be implemented to determine view information. The view information may define views to be presented to users via client computing platforms. In some implementations, operation 52 may be performed by a space module the same as or similar to space module 18 (shown in FIG. 1 and described above).

At an operation 54, segmentation input may be obtained. For example, values of system variables by which to define player segments of the virtual space may be obtained. In some implementations, operation 54 may be performed by a communication module the same as or similar to communication module 22 (shown in FIG. 1 and described above).

At an operation 56, a first segment of players may be formed and a second segment of players may be formed based on the segmentation input obtained at operation 56. The first segment of players may be formed on one or more values of a system variable of the segmentation input. In some implementations, operation 58 may be performed by a segmentation module the same as or similar to segmentation module 24 (shown in FIG. 1 and described above).

At an operation 58, input may be received by communication module 22 for the first feature. In some implementations, operation 58 may be performed by a communication module the same as or similar to communication module 22 (shown in FIG. 1 and described above).

At an operation 60, input may be received by communication module 22 for the second feature. In some implementations, operation 60 may be performed by a communication module the same as or similar to communication module 22 (shown in FIG. 1 and described above).

At an operation 62, a comparison of the first segment of players and the second segment of players based on the first feature and the second feature may be displayed. In some implementations, operation 62 may be performed by a display module the same as or similar to display module 26 (shown in FIG. 1 and described above).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computer-implemented method of facilitating comparison of one or more user-selected segments of players, the method being implemented in a computer system comprising one or more physical processors, the method comprising:

executing an instance of an online game;

implementing the instance of the online game, and using the instance to generate game state information that is transmitted to client computing platforms over a network, the game state information facilitating presentation of views of the online game to the players via the client computing platforms;

forming segments of players solely based on one or more system variables without regard for whether players intend to join the segments, the one or more system variables including account creation date, the segments including at least a first segment of players including a first player and excluding a second player and a second segment of players including the second player and excluding the first player;

receiving, from a client computing platform associated with a user, first feature input regarding a selection of a first feature by which to compare the first segment of players and the second segment of players, the selection being made through an administrative interface presented to the user that is different from any interface presented to the players in the views of the online game;

receiving, from the client computing platform associated with the user, second feature input regarding a selection of a second feature by which to compare the first segment of players and the second segment of players, the selection being made through the administrative interface;

displaying, via the client computing platform associated with the user, a comparison of the first segment of players and the second segment of players based on the first feature and the second feature, wherein displaying the comparison comprises:

displaying, via the client computing platform associated with the user, a set of values relating to the first segment of players based on the first feature and the second feature; and displaying, via the client computing platform associated with the user, a set of values relating to the second segment of players based on the first feature and the second feature; and displaying, via the client computing platform associated with the user, an alert if a first value from the first set of values displayed and a corresponding second value from the second set of values deviate from each other by more than a threshold amount.

2. The method of claim 1, wherein the first segment comprises one or more players that share a first value relating to the system variable and the second segment comprises one or more players that share a second value relating to the system variable, the second value being different from the first value.

3. The method of claim 1, wherein a feature comprises one of: net revenue, purchase date, number of days in game, lifetime average revenue per player, average revenue per player, or date range.

4. The method of claim 1, wherein displaying the comparison comprises:
    receiving, from the client computing platform associated with the user, a display input regarding a selection of a type of display, the type of display comprising one of: text, spreadsheet, bar graph, line graph, histogram, or 3-dimensional display; and
    displaying, via the client computing platform associated with the user, the comparison based on the selected type of display.

5. The method of claim 1, further comprising:
    displaying, via the client computing platform associated with the user, an alert if a first value from the first set of values displayed deviates from the previous corresponding value of the first set of values by more than a threshold amount.

6. The method of claim 1, wherein the comparison includes one or more of: average value, median value, mode value, first standard deviation, second standard deviation, median absolute deviation, or weighted average.

7. The method of claim 6, wherein displaying the comparison comprises:
    receiving display input comprising a selection of a first statistical function and a second statistical function;
    displaying, via the client computing platform associated with the user, a first set of values relating to the first segment of players based on the first feature, the second feature, and the first statistical function;
    displaying, via the client computing platform associated with the user, a second set of values relating to the first segment of players based on the first feature, the second feature, and the second statistical function;
    displaying, via the client computing platform associated with the user, a third set of values relating to the second segment of players based on the first feature, the second feature, and the first statistical function; and
    displaying, via the client computing platform associated with the user, a fourth set of values relating to the second segment of players based on the first feature, the second feature, and the second statistical function.

8. A system configured to facilitate comparison of one or more user-selected segments of players, the system comprising:
    one or more physical processors configured by machine readable instructions to:
    execute an instance of a an online game, and to implement the instance of the online game, and use the instance to generate game state information that is transmitted to client computing platforms over a network, the game state information facilitating presentation of views of the online game to the players via the one or more client computing platforms;
    receive, from a client computing platform associated with a user, first feature input regarding a selection of a first feature by which to compare players, the selection being made through an administrative interface presented to the user that is different from any interface presented to the players in the views of the online game; and
    receive, from the client computing platform associated with the user, second feature input regarding a selection of a second feature by which to compare players, the selection being made through the administrative interface;
    form segments of players solely based on one or more system variables without regard for whether players intend to join the segments, the one or more system variables including account creation date, the segments including at least a first segment of players including a first player and excluding a second player and a second segment of players including the second player and excluding the first player;
    effectuate display, via the client computing platform associated with the user, of a comparison of the first segment of players and the second segment of players based on the first feature and the second feature, wherein such display includes:
        display, via the client computing platform associated with the user, a set of values relating to the first segment of players based on the first feature and the second feature; and
        display, via the client computing platform associated with the user, a set of values relating to the second segment of players based on the first feature and the second feature; and
    effectuate display, via the client computing platform associated with the user, an alert if a first value from the first set of values displayed and a corresponding second value from the second set of values deviate from each other by more than a threshold amount.

9. The system of claim 8, wherein the first segment comprises one or more players that share a first value relating to the system variable and the second segment comprises one or more players that share a second value relating to the system variable, the second value being different from the first value.

10. The system of claim 8, wherein a feature comprises one of: net revenue, purchase date, number of days in game, lifetime average revenue per player, average revenue per player, or date range.

11. The system of claim 8, wherein the one or more processors are further configured by machine-readable instructions to:
    receive, from the client computing platform associated with the user, a display input regarding a selection of a type of display, the type of display one of: text, spreadsheet, bar graph, line graph, histogram, or 3-dimensional display; and
    display, via the client computing platform associated with the user, the comparison based on the selected type of display.

12. The system of claim 8, wherein the one or more processors are further configured by machine-readable instructions to:
    display, via the client computing platform associated with the user, an alert if a first value from the first set of values displayed deviates from the previous corresponding value of the first set of values by more than a threshold amount.

13. The system of claim 8, wherein the comparison comprises one or more of: average value, median value, mode value, first standard deviation, second standard deviation, median absolute deviation, or weighted average.

14. The system of claim 13, wherein the one or more processors are further configured by machine-readable instructions to:
receiving display input comprising a selection of a first statistical function and a second statistical function;
displaying, via the client computing platform associated with the user, a first set of values relating to the first segment of players based on the first feature, the second feature, and the first statistical function;
displaying, via the client computing platform associated with the user, a second set of values relating to the first segment of players based on the first feature, the second feature, and the second statistical function;
displaying, via the client computing platform associated with the user, a third set of values relating to the second segment of players based on the first feature, the second feature, and the first statistical function; and
displaying, via the client computing platform associated with the user, a fourth set of values relating to the second segment of players based on the first feature, the second feature, and the second statistical function.

* * * * *